United States Patent [19]
Kweon et al.

[11] Patent Number: 5,962,352
[45] Date of Patent: Oct. 5, 1999

[54] METHOD FOR FABRICATING POROUS COMPOSITE OXIDE

[75] Inventors: Ho-jin Kweon, Suwon; Kae-dong Baek, Seoul; Soon-kyo Hong, Anyang; Dong-gon Park, Seoul; Hye-jin Kim, Kwangmyeong, all of Rep. of Korea

[73] Assignee: Samsung Electronics Co., Ltd., Rep. of Korea

[21] Appl. No.: 08/890,766

[22] Filed: Jul. 11, 1997

Related U.S. Application Data

[63] Continuation of application No. 08/805,826, Feb. 26, 1997, abandoned.

[30] Foreign Application Priority Data

Jul. 31, 1996 [KR] Rep. of Korea ........................ 96-32070

[51] Int. Cl.$^6$ ........................................................ C03C 3/00
[52] U.S. Cl. .................... 501/12; 501/80; 501/85; 423/328.1; 423/330.1; 423/332; 423/333
[58] Field of Search ................... 501/12, 80, 85; 423/328.1, 330.1, 332, 333

[56] References Cited

U.S. PATENT DOCUMENTS

| | | | |
|---|---|---|---|
| 2,438,560 | 7/1948 | Kanhofer | 423/330.1 |
| 2,512,053 | 6/1950 | Calmon | 423/330.1 |
| 4,181,532 | 1/1980 | Woodhead | 501/85 |
| 4,937,210 | 6/1990 | Jones et al. | 501/80 |
| 5,610,109 | 3/1997 | Anderson et al. | 501/80 |

*Primary Examiner*—Paul Marcantoni
*Attorney, Agent, or Firm*—Burns, Doane, Swecker & Mathis LLP

[57] ABSTRACT

A method for fabricating a porous composite oxide is provided. The method includes the steps of: (a) slowly mixing a solution including a silicon oxide source and a solution including an aluminum oxide source; (b) adding hydrochloric acid to the mixed solution prepared in said step (a) to obtain a sol; and (c) adding sodium hydroxide to said sol, reacting the obtained resultant at room temperature for 30 minutes to 12 hours, and drying the resultant. The porous composite oxide has an abundance of fine pores and the distribution of pore size is relatively uniform, so that the porous composite oxide is suitable for a carrier.

9 Claims, 4 Drawing Sheets

METHOD FOR FABRICATING POROUS COMPOSITE OXIDE

The subject application is a Rule 53 Continuation of U.S. Ser. No. 08/805,826, filed Feb. 26, 1997, abandoned.

BACKGROUND OF THE INVENTION

The present invention relates to a method for fabricating a porous composite oxide, and more particularly, to a method for fabricating a porous composite oxide to be used as a carrier, in which fine pores are formed in abundance and the distribution of pore size is relatively uniform.

Current development in chemical related industries has accompanied development of various catalysts. Generally, a catalyst is essentially used for synthesis, decomposition and reforming of substance.

Such a catalyst includes particles of metal or other components. Also, there are various application methods for the catalyst; typically, catalyst is used in combination with a carrier.

A carrier used for impregnating catalyst particles is non-reactive as such and has an abundance of fine pores. In order to activate a catalytic reaction, it is necessary to secure a space sufficient for contact between the catalytic components and reactants. As a common carrier, there are silica, alumina, alumino-silicate, zeolite and active carbon.

Particularly, alumino-silicate is widely used as a carrier due to its pores which have various sizes. The alumino-silicate is generally obtained by dissolving a soluble aluminum oxide source and a soluble silicon oxide source and applying a temperature higher than 100° C. under a high pressure to the resultant solution, to thereby cause a hydrothermal reaction.

On the other hand, for the active catalytic reaction, a carrier having an abundance of pores is required. However, the alumino-silicate fabricated according to the above hydrothermal method does not have enough pores for impregnating catalyst particles therein.

SUMMARY OF THE INVENTION

It is an object of the present invention to provide a method for fabricating a porous composite oxide for a carrier which has an abundance of fine pores, and has a relatively uniform pore size distribution.

To achieve the above object, there is provided a method for fabricating a porous composite oxide comprising the steps of: (a) slowly mixing a solution including a silicon oxide source and a solution including an aluminum oxide source; (b) adding hydrochloric acid to the mixed solution prepared in said step (a) to obtain a sol; and (c) adding sodium hydroxide to said sol, reacting the obtained resultant at room temperature for 30 minutes to 12 hours, and drying the resultant.

According to the present invention, the solution including the silicon oxide source and the aluminum oxide source is reacted at a temperature below 100° C. Unlike the conventional hydrothermal method, the alumino-silicate prepared under the condition of a temperature lower than 100° C. according to the present invention has an abundance of fine pores.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
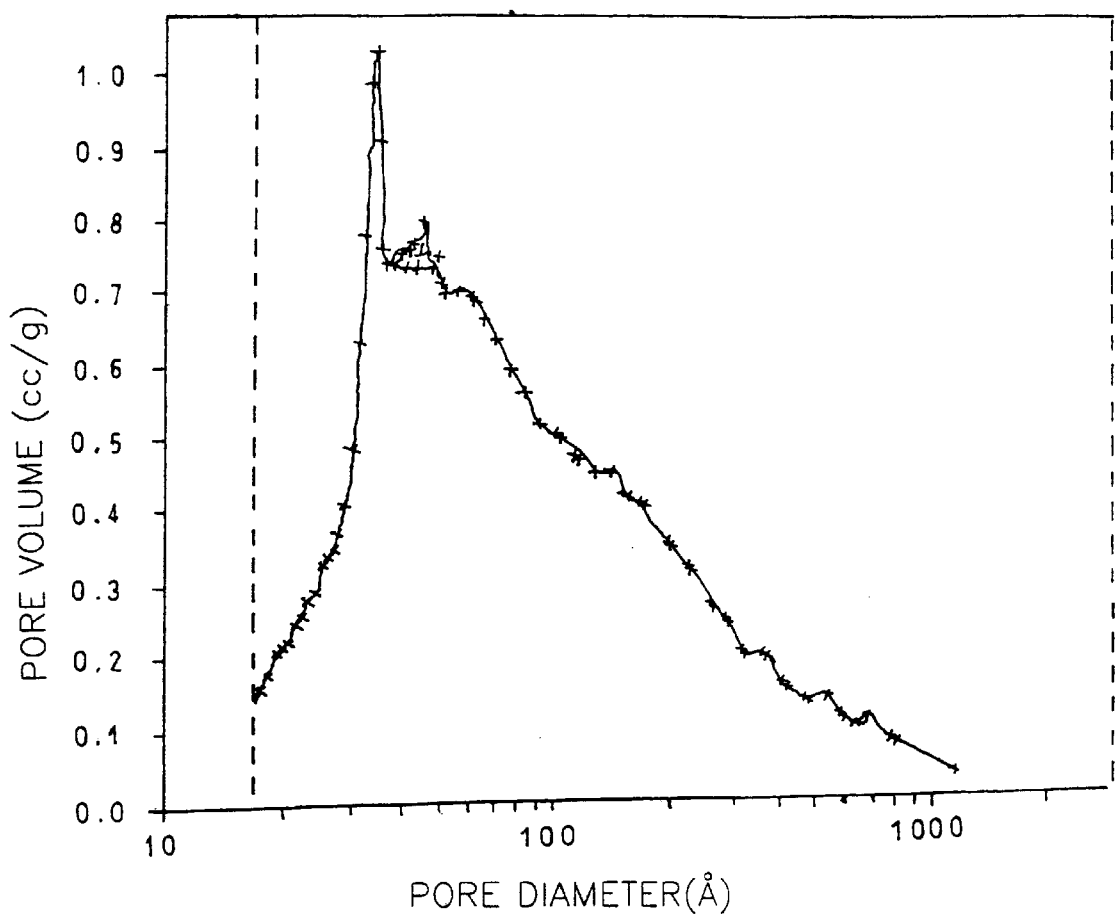
FIGS. 1 to 3 are graphs showing the relation of pore volume to pore diameter of a porous composite oxide fabricated according to a preferred embodiment of the present invention.

Hereinafter, a fabricating process of the alumino-silicate as a composite oxide according to the present invention will be described in detail.

First, a soluble silicon oxide source and a soluble aluminum oxide source are separately dissolved in water.

According to the present invention, a silicate, particularly, sodium silicate is used as the preferred silicon oxide source. Also, an aluminate, particularly, sodium aluminate, is used as the preferred aluminum oxide source. Furthermore, since the solubility of the reactant is low in water, it is preferable to heat the aqueous solution to dissolve the reactant. Particularly, since the solubility in water of the silicon oxide source is poor at room temperature, it is preferable to heat the aqueous solution to dissolve the silicon oxide source. Here, the heating temperature may vary depending on the solubility and property of the reactant, however, a preferred temperature range is 50~60° C., in general.

After the aqueous solutions of the silicon oxide source and the aluminum oxide source are prepared, the two solutions are mixed. Here, it is preferable to control the mixing ratio of the silicon oxide source and aluminum oxide source such that the mole ratio of silicon to aluminum is 1 to 3.

On the other hand, in order to evenly mix the silicon oxide source and the aluminum oxide source, one of the solutions should be added slowly to the other solution while simultaneously heating and stirring the solution.

When the two solutions are completely mixed, hydrochloric acid is added until a transparent sol is obtained. Subsequently, sodium hydroxide is added and the resultant solution is maintained at room temperature for a predetermined period. Then, the sol becomes a gel. The reaction is performed for 30 minutes to 12 hours, preferably, 30 minutes to 1 hour. Here, the sodium hydroxide stimulates an active and uniform reaction between the silicon oxide source and the aluminum oxide source. Preferably, hydrochloric acid and sodium hydroxide are used in dilute solution and the pH of the reactant solution after addition of sodium hydroxide is maintained within the range of 3~12.

Finally, the gel is filtrated and the precipitate obtained from the filtration is dried to obtain alumino-silicate having fine pores. Here, a drying is performed at a temperature range of 100~150° C. and in the air.

Hereinafter, the present invention will be described in detail with reference to preferred embodiments thereof and a comparative example; however, it is noted that the present invention is not limited to the particular forms to be illustrated.

EXAMPLE 1

First, 98.4 g of sodium silicate ($Na_2SiO_3$) was completely dissolved in 150 ml of distilled water at 55° C. Also, 152.5 g of sodium aluminate ($NaAlO_2$) was separately dissolved in 700 ml of distilled water. Then, the sodium aluminate solution was slowly poured into the sodium silicate solution._

During the mixing process, the mixed solution was continuously heated to 55° C. with stirring. After the two solutions were completely mixed, 6N HCl was added until the reactant mixture became transparent. Then, 6N NaOH was added to the transparent solution until the pH of the solution reached 11, and the resultant solution was maintained for 60 minutes to obtain a gel. The gel was filtrated using a vacuum apparatus, and the precipitate was then dried at 120° C. for 24 hours to obtain alumino-silicate in a powder form.

The surface area and the relation of pore volume to pore size with respect to the prepared powder were measured. As a result, the BET surface area was 395.5 $m^2/g$ and an abundance of pores was formed. Also, the distribution of pore size was relatively uniform (see FIG. 1).

EXAMPLE 2

Alumino-silicate in a powder form was prepared using the same method as described in Example 1 except that 6N NaOH was added to adjust the pH of the solution to 7.

Figure 2:
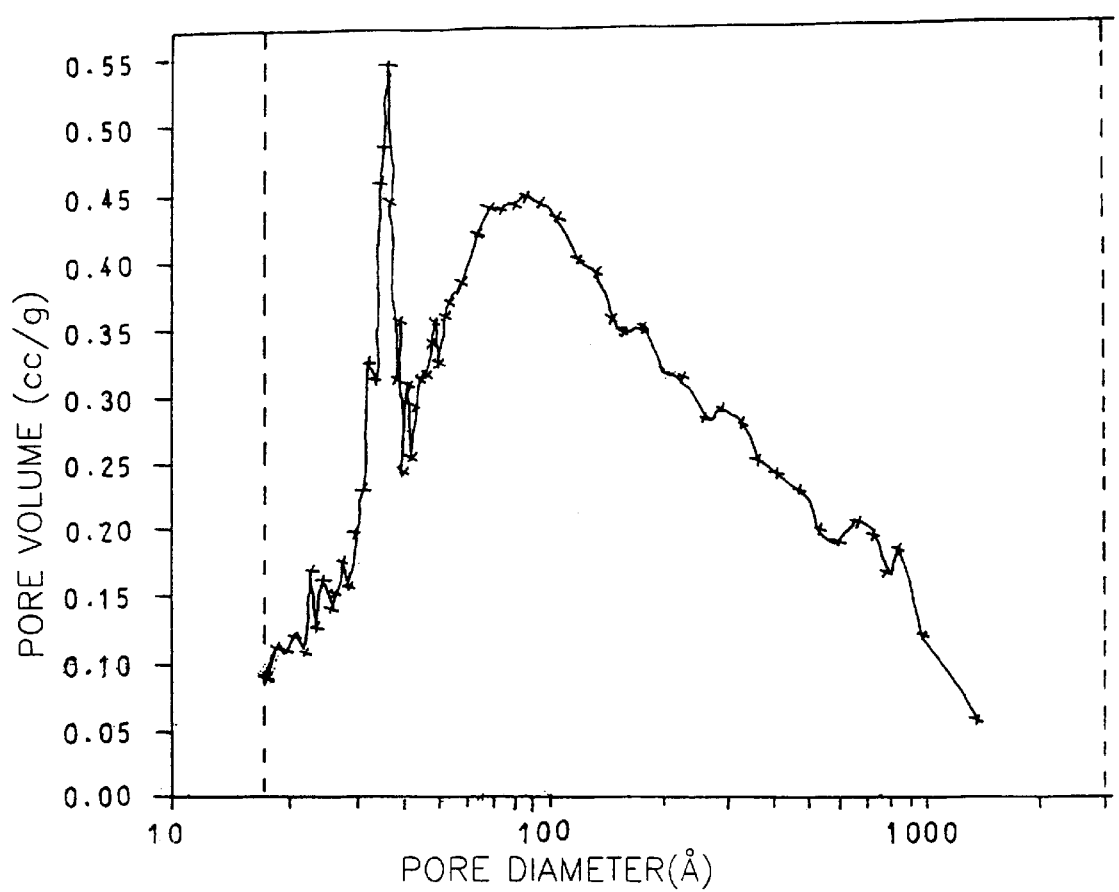

The surface area and the relation of pore volume to pore size with respect to the prepared powder were measured. As a result, the BET surface area was 238.8 $m^2/g$ and an abundance of pores was obtained. Also, the distribution of pore size was relatively uniform (see FIG. 2).

EXAMPLE 3

Alumino-silicate in a powder form was prepared using the same method as described in Example 1 except that 6N NaOH was added to adjust the pH of the solution to 3.

Figure 3:
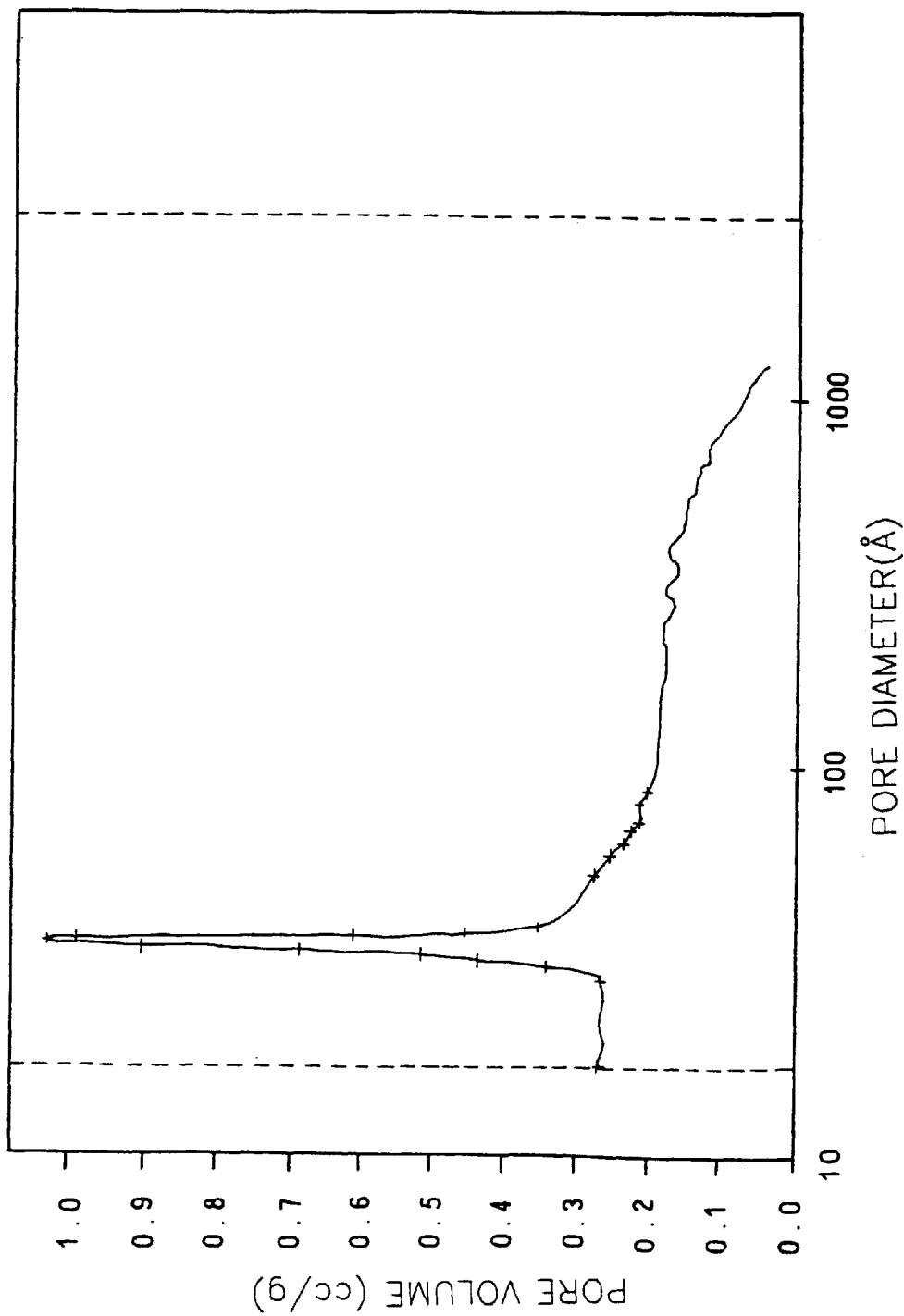

The surface area and the relation of pore volume to pore size with respect to the prepared powder were measured. As a result, the BET surface area was 409.6 $m^2/g$ and an abundance of pores was obtained. Also, the distribution of pore size was relatively uniform (see FIG. 3).

COMPARATIVE EXAMPLE

The sol including soluble sodium silicate and sodium aluminate was prepared using the same method as described in Example 1. Then, 6N NaOH was added to the sol until the pH of the sol reached 7. After 60 minutes, a gel was obtained. The gel was placed into a high-pressure reaction chamber and reacted at 150° C., 150 psi for 1 hour. The resultant was filtrated using a vacuum apparatus, and the precipitate was then dried at 100° C. for 24 hours to obtain alumino-silicate in a powder form.

Figure 4:
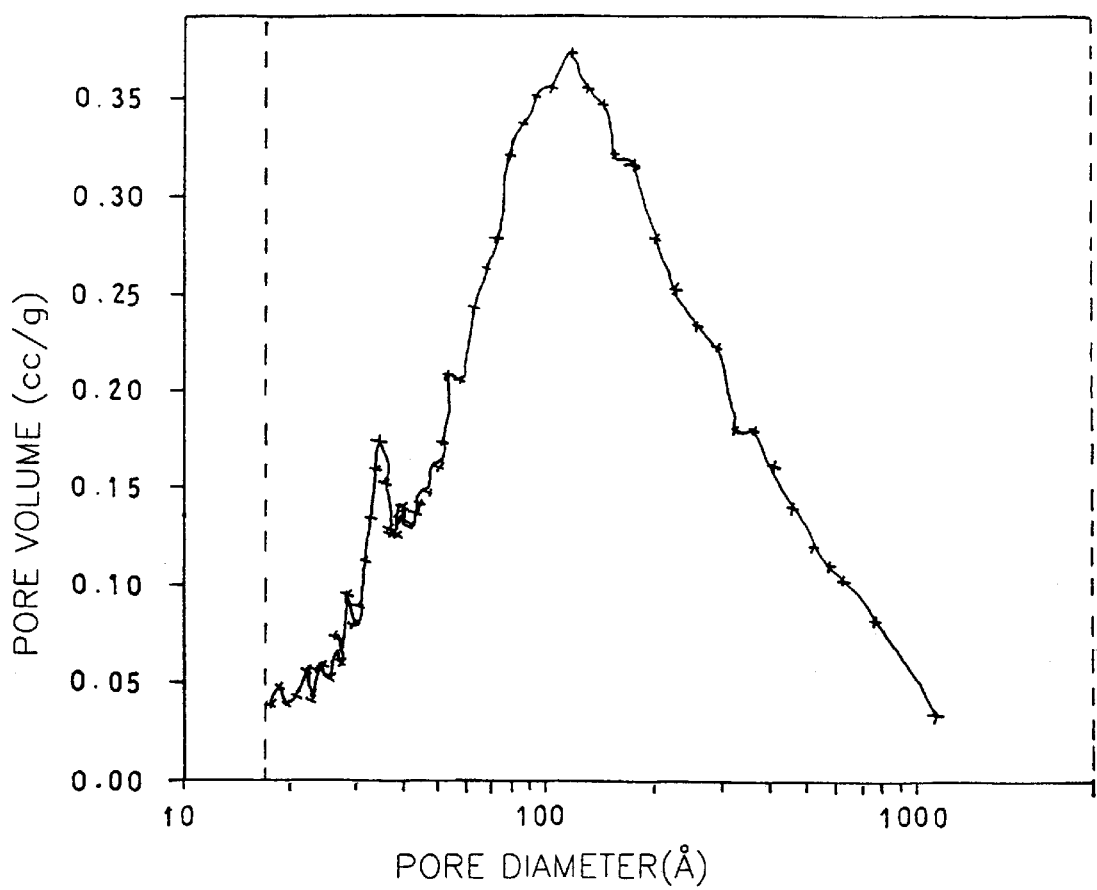
FIG. 4 is a graph showing the relation of pore volume to pore diameter of a porous composite oxide fabricated according to a conventional method.

Then, the surface area and the relation of pore volume to pore size with respect to the prepared powder were measured. As a result, according to the alumino-silicate prepared by the conventional method, an abundance of pores was obtained and the distribution of pore size was relatively uniform (see FIG. 4). However, the BET surface area was small, i.g., 135 $m^2/g$.

From the results of the examples and the comparative example, in the porous composite oxide fabricated at a temperature lower than 100° C. according to the present invention, there are an abundance of fine pores and the distribution of pore size is relatively uniform, so that the porous composite oxide of the present invention is suitable for a carrier.

What is claimed is:

1. A method for fabricating a porous composite oxide comprising the steps of:

(a) mixing a solution including a silicon oxide source and a solution including an aluminum oxide source to form a mixed solution wherein the mole ratio of silicon to aluminum of said mixed solution is 1~3 and wherein the temperature of the mixed solution is heated to a temperature between 50° C. to less than 100° C.;

(b) adding hydrochloric acid to the mixed solution prepared in said step (a) to obtain a transparent sol until the pH of the transparent sol reaches 3~12; and (c) adding sodium hydroxide to said transparent sol, reacting the obtained resultant at room temperature for 30 minutes to 12 hours, and drying the resultant.

2. A method for fabricating a porous composite oxide as claimed in claim 1, wherein said silicon oxide source is a silicate.

3. A method for fabricating a porous composite oxide as claimed in claim 2, wherein said silicate is sodium silicate.

4. A method for fabricating a porous composite oxide as claimed in claim 1, wherein said aluminum oxide source is an aluminate.

5. A method for fabricating a porous composite oxide as claimed in claim 4, wherein said aluminate is sodium aluminate.

6. A method for fabricating a porous composite oxide as claimed in claim 1, wherein the reaction of said step (c) is performed for 30 minutes to 1 hour.

7. A method for fabricating a porous composite oxide as claimed in claim 1, wherein the drying of said step (c) is performed at 100~150° C. in the air.

8. A method for fabricating a porous composite oxide as claimed in claim 1 wherein the porous composite oxide has a BET surface area of at least about 240 $m^2/g$.

9. A method for fabricating a porous composite oxide as claimed in claim 1 wherein the porous composite oxide has a BET surface area of at least about 400 $m^2/g$.

* * * * *